(12) United States Patent
Levan et al.

(10) Patent No.: US 8,351,879 B2
(45) Date of Patent: Jan. 8, 2013

(54) SAFE AREA VOLTAGE AND CURRENT INTERFACE

(75) Inventors: David O. Levan, Baldwinsville, NY (US); Munroe C. Clayton, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 179 days.

(21) Appl. No.: 12/979,701

(22) Filed: Dec. 28, 2010

(65) Prior Publication Data

US 2012/0164960 A1 Jun. 28, 2012

(51) Int. Cl.
*H03C 1/62* (2006.01)
*H04K 3/00* (2006.01)
(52) U.S. Cl. .................. 455/115.1; 455/127.1
(58) Field of Classification Search ........... 455/115.1, 455/121, 127.1
See application file for complete search history.

(56) References Cited

U.S. PATENT DOCUMENTS

| 6,933,893 B2 | 8/2005 | Rubinshteyn et al. |
| 7,408,517 B1 | 8/2008 | Poilasne et al. |
| 2004/0000919 A1 | 1/2004 | Gupta et al. |
| 2009/0253388 A1 | 10/2009 | Kiebl et al. |
| 2009/0286487 A1 | 11/2009 | Rofougaran et al. |
| 2010/0216412 A1 | 8/2010 | Rofougaran |

OTHER PUBLICATIONS

"Intrinsically Safe Barrier Relays: NY2 and 8501TO," Square D Company, (1998), found online at http://stevenengineering.com/Tech_Support/PDFs/45RINTC.pdf (8 pages).
U.S. Appl. No. 12/979,708, filed Dec. 28, 2010 (22 pages).
International Search Report for international application No. PCT/US2011/067191, dated Mar. 20, 2012 (21 pages).

*Primary Examiner* — Lee Nguyen
(74) *Attorney, Agent, or Firm* — Hamre, Schumann, Mueller & Larson, P.C.

(57) ABSTRACT

A safe area voltage and current interface is provided that includes an antenna and mode selection unit, an antenna tuner unit and an interface unit. The antenna and mode selection unit determines a frequency mode and an antenna mode for an output signal. The antenna tuner unit is directly connected to the antenna and mode selection unit and is configured to tune the output signal based on the frequency mode and the antenna mode determined by the antenna and mode selection unit. The interface unit is directly connected to the antenna tuner unit and is configured to ensure that a current and voltage level of the output signal does not exceed an intrinsically safe current and voltage level, while maintaining the peak current level of the output signal to a level sufficient to drive an electronic component disposed in an unsafe environment.

16 Claims, 3 Drawing Sheets

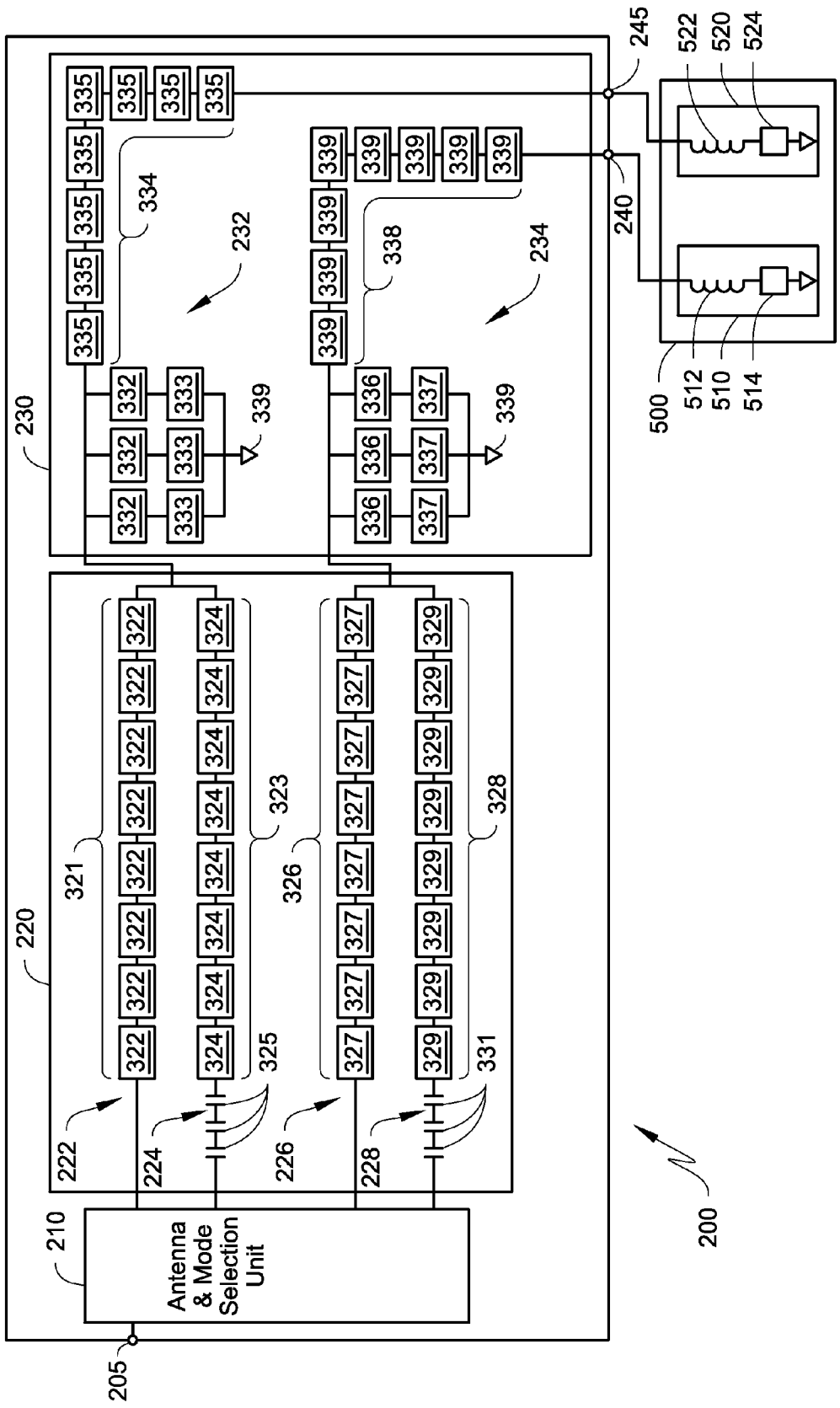

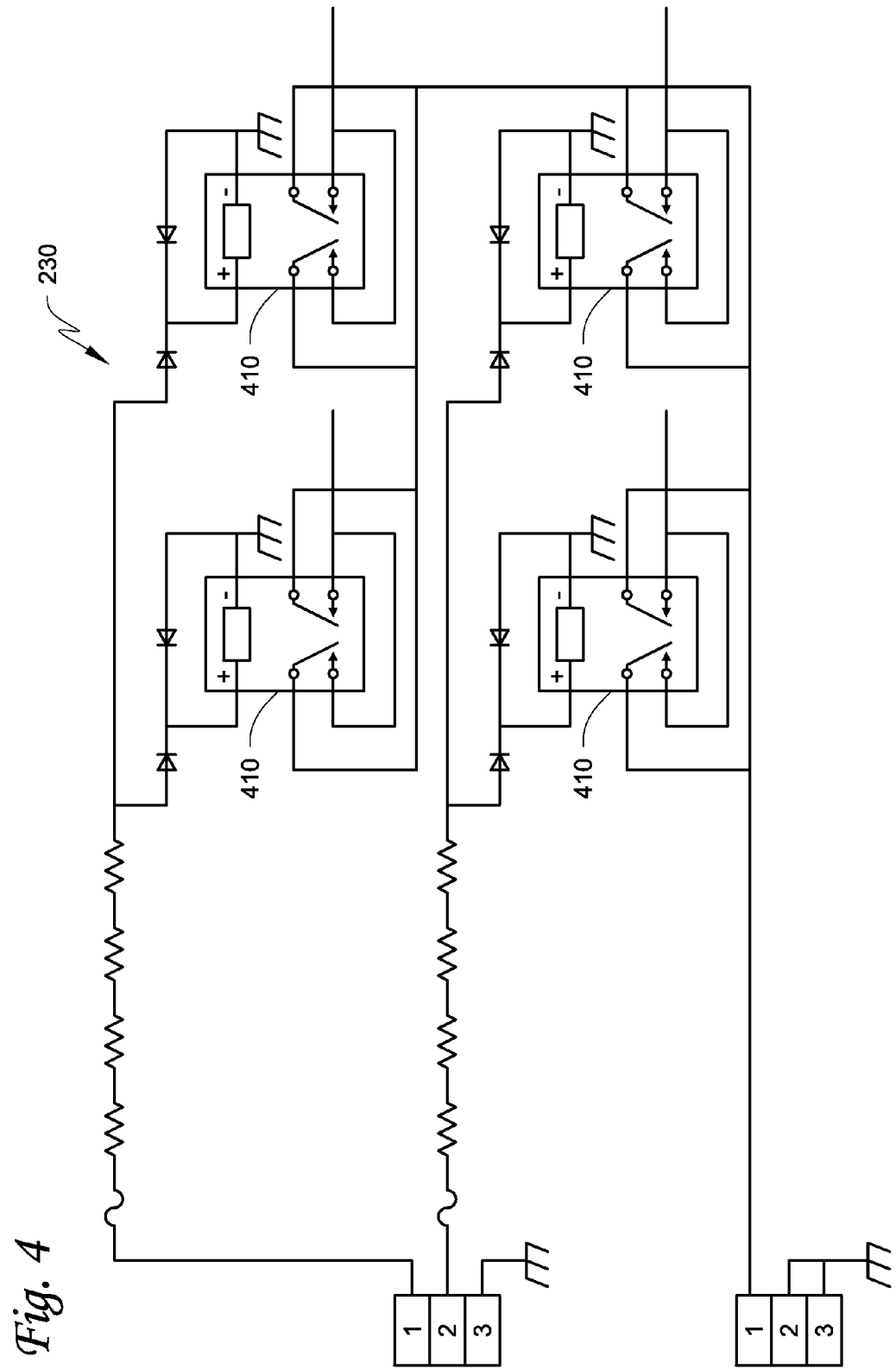

SAFE AREA VOLTAGE AND CURRENT INTERFACE

FIELD

This disclosure relates to the field of safe area electronic systems. More particularly, this description relates to a safe area voltage and current interface.

BACKGROUND

In unsafe environments and particularly explosive environments, such as a mine environment or an oil well environment, it is necessary that the amount of energy dissipated into the surrounding atmosphere from electronic components disposed in the unsafe environment needs to remain below certain levels (e.g. 300 micro Joules) to avoid igniting a mixture of methane and air that would result in an explosion. In order to ensure that any electronic components disposed in the unsafe environment are not a risk for causing an explosion, safe area electronic systems used to drive the electronic component are required to output a signal that is guaranteed to stay below certain voltage and current levels.

SUMMARY

This application describes safe area electronic systems for providing a controlled voltage and current to electronic components disposed in an unsafe environment. Particularly, the embodiments described herein are discussed with respect to safe area electronic systems for use in an explosive environment, such as a mine environment, where the amount of energy dissipated into the surrounding atmosphere from electronic components needs to remain below certain levels to avoid igniting a mixture of methane and air that would result in an explosion. However, the embodiments provided herein can also be used in other scenarios where controlling the amount of voltage and current provided to an electronic component is desired.

The safe area voltage and current interface outputs a safe level of current and voltage to ensure that an external electronic component driven by the output of the safe area voltage and current interface cannot dissipate energy that is greater than a safe energy level (e.g. less than 300 µJ), while also ensuring that the voltage and current outputted from the safe area voltage and current interface is very near the safe voltage and current levels necessary to drive the external electronic component. In some embodiments, a safe area voltage and current interface is designed to tune and drive a magnetic antenna unit that is disposed in an unsafe environment. In particular, the safe area voltage and current interface is designed to ensure that the peak voltage and current levels of an output signal outputted from a safe area electronic system to magnetic antenna unit remains below, for example, Mine Safety and Health Administration's (MSHA) current intrinsically safe current and voltage levels, while still providing sufficient current to drive a magnetic antenna (i.e. between about 1-2 amps).

In one embodiment, a safe area voltage and current interface is provided that includes an antenna and mode selection unit, an antenna tuner unit and an interface unit. The antenna and mode selection unit determines a frequency mode and an antenna mode for an output signal. The antenna tuner unit is directly connected to the antenna and mode selection unit and is configured to tune the output signal based on the frequency mode and the antenna mode determined by the antenna and mode selection unit. The interface unit is directly connected to the antenna tuner unit and is configured to ensure that a current and voltage level of the output signal does not exceed an intrinsically safe current and voltage level, while maintaining the peak current level of the output signal to a level sufficient to drive an electronic component disposed in an unsafe environment.

In another embodiment, a safe area electronic system that includes a signal power source, a safe area voltage regulator and a safe area voltage and current interface is provided. The signal power source generates a voltage signal. The safe area voltage regulator receives the generated voltage signal and outputs the voltage signal with a regulated peak voltage that does not exceed a safe area voltage threshold. The safe area voltage and current interface receives the voltage signal with the regulated peak voltage and outputs an output signal that is configured to drive an electronic component located in an unsafe environment. The safe area voltage and current interface includes an antenna and mode selection unit, an antenna tuner unit and an interface unit. The antenna and mode selection unit determines a frequency mode and an antenna mode for an output signal. The antenna tuner unit is directly connected to the antenna and mode selection unit and is configured to tune the output signal based on the frequency mode and the antenna mode determined by the antenna and mode selection unit. The interface unit is directly connected to the antenna tuner unit and is configured to ensure that a current and voltage level of the output signal does not exceed an intrinsically safe current and voltage level, while maintaining the peak current level of the output signal to a level sufficient to drive an electronic component disposed in an unsafe environment.

DRAWINGS

FIG. 3 provides a circuit schematic of a safe area voltage and current interface component that is designed to meet current MSHA safety requirements, according to one embodiment.

FIG. 4 provides a circuit schematic of an antenna and mode selection unit, according to one embodiment.

DETAILED DESCRIPTION

The embodiments provided herein are directed to safe area electronic systems, Particularly, the embodiments herein provide safe area electronic systems that ensure a controlled voltage and current to electronic components disposed in an unsafe environment.

The embodiments provided herein provide a safe area voltage and current interface component that ensures that voltage and current levels of an output signal outputted to an external electronic component remains below intrinsically safe current and voltage levels, while still providing sufficient current to drive the external component.

In particular, the embodiments described herein are discussed with respect to safe area electronic systems for use in an explosive environment, such as a mine environment or an oil well environment, where the amount of energy dissipated into the surrounding atmosphere from electronic components needs to remain below certain levels (e.g. 300 micro Joules) to avoid igniting a mixture of methane and air that would result in an explosion. However, the embodiments provided herein can also be used in other scenarios where controlling the amount of voltage and current provided to an electronic component is desired.

The embodiments provided herein provide a safe area voltage and current interface component that ensures that voltage and current levels of an output signal outputted to an external electronic component remains below intrinsically safe current and voltage levels, while still providing sufficient current to drive the external component.

Figure 1:
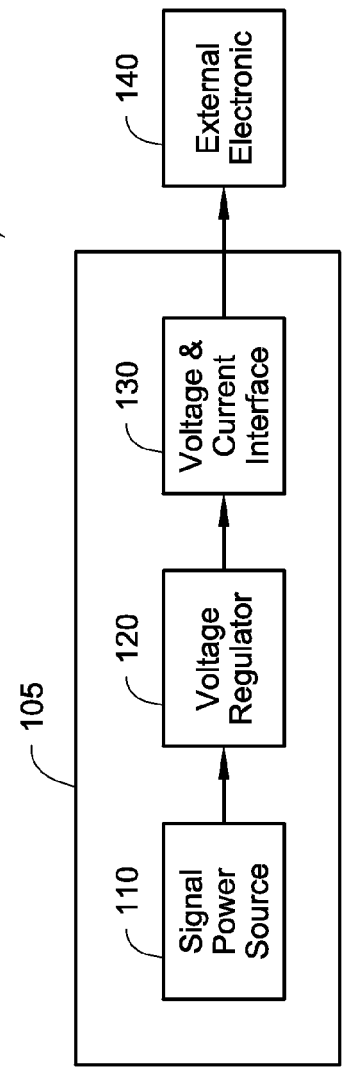
FIG. 1 is a block diagram of a safe area electronic system for providing a controlled voltage and current to an external electronic component disposed in an unsafe environment, according to one embodiment.

FIG. 1 is a block diagram of one embodiment of a safe area electronic system 100 for providing a controlled voltage and current to an external electronic component 140 disposed in an unsafe environment. Components of the system 100 are housed within an explosion proof box 105. In particular, the explosion proof box 105 houses a signal power source component 110, a safe area voltage regulator component 120 and a safe area voltage and current interface component 130.

While not shown, other electronic components and battery components can be housed within the explosion proof box 105. In one embodiment, the design constraints of the explosion proof box 105 are determined based on the safety criteria provided by health and safety organizations such as, for example, MSHA.

The signal power source 110 provides a voltage signal used to drive the safe area voltage and current interface component 130. The voltage signal is regulated by the safe area voltage regulator component 120 to not exceed a certain value (e.g., a safe area voltage limit) and ensure that the safe area voltage and current interface component 130 is providing an intrinsically safe voltage and current output signal to the external electronic component 140 disposed in the unsafe environment. In one embodiment, the signal power source is, for example, an audio power amplifier that is capable of generating a maximum 28 $V_{rms}$ signal and plus or minus 45 volts DC under faulted conditions.

The safe area voltage regulator 120 is designed to limit the peak voltage of the voltage signal produced by the signal power source 110 to a maximum voltage threshold regardless of the failure modes provided in the signal power source 110. The safe area voltage regulator 120 is also designed to ensure that the peak voltage of the voltage signal outputted from the safe area voltage regulator component 120 to the safe area voltage and current interface component 130 is maintained near the maximum voltage threshold but does not exceed the maximum voltage threshold, even if one or more faults occur in the signal power source 110 or the safe area voltage regulator 120.

A fault as described herein is defined as any failure to a circuit element within a safe area electronic system or to an external electronic component that is driven by the safe area electronic system. Examples of faults include, but are not limited to, a loss element or shunt regulator becoming shorted or opened, a connection between the safe area electronic system and the external electronic component breaking or shorting, the external electronic component breaking or shorting, etc.

In one embodiment, the safe area voltage regulator 120 limits the peak voltage inputted into the voltage regulator 120 to a 12 $V_{rms}$ signal outputted from the safe area voltage regulator 120. Particularly, the safe area voltage regulator 120 is designed to operate and fail in a safe manner. That is, the safe area voltage regulator 120 is provided with multiple redundancies to ensure that the peak voltage of any voltage signal sent out of the safe area voltage regulator 120 is maintained near the maximum voltage threshold but does not exceed the maximum voltage threshold. For example, even if a 250 $V_{rms}$ signal (occurring when a fault that allowed a primary power signal (e.g. 60 Hz in the United States of America) to pass through the signal power source 110 and into the voltage regulator 120), the voltage regulator 120 will still output a 12 $V_{rms}$ signal for a limited time, and then safely fail (i.e. safely prevent a voltage signal from being outputted from the safe area voltage regulator 120).

Examples of a safe area voltage regulator that can be used in conjunction with the embodiments provided herein are disclosed in U.S. application Ser. No. 12/979,708, filed on Dec. 28, 2010 and titled SAFE AREA VOLTAGE REGULATOR.

The safe area voltage and current interface 130 is designed to ensure that peak voltage and current levels of an output signal outputted from the system 100 to the external electronic component 140 remain below intrinsically safe levels, while still providing sufficient current to drive the external component 140.

The safe area voltage and current interface 130 drives the external electronic component 140 and is configured to supply sufficient voltage and current to the external electronic component 140 that are close to the maximum current and voltage safety thresholds, while ensuring that the maximum current and voltage safety thresholds are not crossed. In some embodiments, the external electronic component 140 is a magnetic antenna for transmitting an audio signal. In other embodiments, the safe area voltage and current interface 130 is configured to drive other devices such as, for example, relay actuators, solenoid actuators, AC motors, and DC motors.

Figure 2:
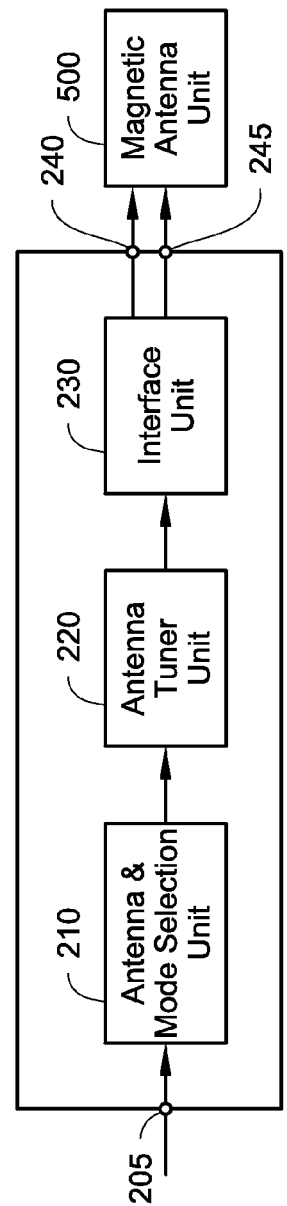
FIG. 2 is a block diagram of a safe area voltage and current interface component, according to one embodiment.

FIGS. 2-4 provide one embodiment of a safe area voltage and current interface component 200 that is designed to tune and drive a magnetic antenna unit 500 that is disposed in an unsafe environment. The safe area voltage and current interface component 200 is configured to ensure that the peak voltage and current levels of an output signal outputted from a safe area electronic system to the magnetic antenna unit 500 remains below MSHA's current intrinsically safe current and voltage levels, while still providing sufficient current to drive the magnetic antenna unit 500 (i.e., about 1-2 amps). Also, in this embodiment, the safe area voltage and current interface 200 includes additional antenna tuning circuitry for transmitting magnetic communications via the magnetic antenna unit 500.

FIG. 2 is a block diagram of one embodiment of the safe area voltage and current interface component 200. The safe area voltage and current interface component 200 includes an input terminal 205, an antenna and mode selection unit 210, an antenna tuner unit 220 and an interface unit 230, and output terminals 240 and 245. The safe area voltage and current interface component 200 is designed to ensure that the peak voltage and current of an output signal outputted outside of an explosion proof box (such as the explosion proof box 105 shown in FIG. 1) remains below MSHA's current intrinsically safe and voltage and current levels, while still providing sufficient current (e.g., approximately 1-2 amps) to drive a magnetic antenna unit.

As shown in FIG. 3, the safe area voltage and current interface component 200 is designed to drive the magnetic antenna unit 500 that includes a long loop magnetic antenna 510 and a medium loop magnetic antenna 520. In one embodiment, the long loop magnetic antenna 510 is a 400 ft magnetic loop antenna and the medium loop magnetic antenna 520 is a 23 turn magnetic loop antenna. In one embodiment, the dimensions of the medium loop magnetic antenna 520 can be, for example, 41 inches by 41 inches by 10 inches.

Also, the safe area voltage and current interface component 200 is further designed to tune an output signal at a high center-frequency channel or at a low center-frequency channel for transmission by either the long loop magnetic antenna 510 or the medium loop magnetic antenna 520. In one embodiment, the high center-frequency channel is a 3200 Hz channel and the low center-frequency channel is a 330 Hz channel.

A voltage signal with a regulated peak voltage is inputted into the safe area voltage and current interface component 200 via the input terminal 205 and directly to the antenna and mode selection unit 210. The antenna and mode selection unit 210 selects whether the output signal outputted from the voltage and current interface component 200 is sent to the long loop magnetic antenna 510 via output terminal 240 or is sent to the medium loop magnetic antenna 520 via output terminal 250. The antenna and mode selection unit 210 also determines whether the output signal outputted from the voltage and current interface component 200 is to be tuned to a high center-frequency channel or a low center-frequency channel.

FIG. 4 provides a schematic diagram of one embodiment of an antenna and mode selection unit 210 made up of relays 410. The relays 410 can be standard, commercially available relay circuits. The safe area voltage and current interface 200 is configured such that any combination of failures to the relays 410 and up to two additional faults in the safe area voltage and current interface 200 will not result in the current and voltage outputted from the safe area voltage and current interface 200 from exceeding maximum current and voltage safety thresholds. In other embodiments, the antenna and mode selection unit 210 is made up of an array of power MOSFETS (not shown).

The antenna and mode selection unit 210 is directly connected to the antenna tuner unit 220. As shown in FIG. 3, the antenna tuner unit 220 is made up of four distinct tuner circuits 222, 224, 226 and 228. The particular tuner circuit 222, 224, 226 and 218 that is used is based on the magnetic antenna and the frequency determined by the antenna and mode selection unit 210.

When the safe area voltage and current interface component 200 is connected to the magnetic antenna 510 via the output terminal 240, the magnetic antenna 510 presents an inductive impedance 512 and a resistive impedance 514 to the safe area voltage and current interface component 200. Similarly, when the safe area voltage and current interface component 200 is connected to the magnetic antenna 520 via the output terminal 245, the magnetic antenna 520 presents an inductive impedance 522 and a resistive impedance 524 to the safe area voltage and current interface component 200. Also, different frequencies channels cause the inductance impedance 512, 522 to create varying levels of inductive resonance in the safe area voltage and current interface component 200. Accordingly, each of the tuner circuits 222, 224, 226 and 228 are configured to tune an output signal for a particular magnetic antenna at a particular frequency.

Particularly, tuner circuit 222 is configured to tune an output signal to a low center-frequency channel that is configured to be sent via the medium loop magnetic antenna 520. Tuner circuit 224 is configured to tune an output signal to a high center-frequency channel that is configured to be sent via the medium loop magnetic antenna 510. Tuner circuit 226 is configured to tune an output signal for a low center-frequency channel and is configured to be sent via the long loop magnetic antenna 520. Tuner circuit 228 is configured to tune an output signal for a high center-frequency channel and is configured to be sent via the long loop magnetic antenna 510.

Each of the tuner circuits 222, 224, 226 and 228 include a unique scaling element 321, 323, 326 and 328, respectively. Each of the unique scaling elements 321, 323, 326 and 328 scales the output signal for the particular frequency channel and antenna being used. Also, each of the unique scaling elements 321, 323, 326 and 328 is made up of a plurality of resistors 322, 324, 327 and 329, respectively, that are connected in series. A plurality of resistors connected in series is used as opposed to a large single resistor element in order to provide redundancy and fault protection in case one or more of the resistors is shorted out so that each of the tuner circuits 222, 224, 226 and 228 can continue to scale the output signal for the particular frequency channel and antenna being used. That is, the greater the number of resistors making up the plurality of resistors 322, 324, 327 and 329, the less the impact on the signal outputted from the tuner circuits 222, 224, 226 and 228 should one or more of the resistors making up the plurality of resistors 322, 324, 327 and 329 fail or short out. This allows the tuner circuits 222, 224, 226 and 228 to operate within designed safety limits and ensures that a current and voltage level of the signal outputted from the safe area voltage and current interface component 200 does not exceed an intrinsically safe current and voltage level, while maintaining the peak current level of the outputted signal to a level sufficient to drive an electronic component disposed in an unsafe environment.

The tuner circuits 224 and 228 are both configured to tune an output signal for a high center-frequency channel, and include an array of three tuning capacitors 325 and 331 connected in series, respectively. The tuning capacitors 325 and 331 are provided to cancel out reactive inductance created by the inductive impedances 512, 522 of the magnetic antennas 510 and 520 when an output signal is being transmitted via a high center-frequency channel. A plurality of capacitors 325 and 331 connected in series is used as opposed to a large single capacitor element in order to provide redundancy and fault protection in case one or two of the capacitors is shorted out, so that the tuner circuits 224, 228 can continue to cancel out reactive inductance. That is, the greater the number of capacitors making up the plurality of capacitors 325 and 331, the less the impact on the signal outputted from the tuner circuits 224 and 228 should one or more of the capacitors making up the plurality of capacitors 325 and 331 fail. This allows the tuner circuits 224 and 228 to operate within designed safety limits and ensures that a current and voltage level of the signal outputted from the safe area voltage and current interface component 200 does not exceed an intrinsically safe current and voltage level, while maintaining the peak current level of the outputted signal to a level sufficient to drive an electronic component disposed in an unsafe environment.

The antenna tuner unit 220 is directly connected to the interface unit 230. The interface unit 230 includes two interface circuits 232 and 234. The interface circuit 232 is directly connected to the output of the tuner circuits 222 and 224 at one end and directly connected to the output terminal 245 at the other end so as to connect to the magnet antenna 520. The interface circuit 232 is directly connected to the output of the tuner circuits 226 and 228 at one end and directly connected to the output terminal 240 at the other end so as to connect to the magnet antenna 510.

Each of the interface circuits 232 and 234 include an array of shunt regulators 332 and 336 connected in parallel, respectively. The shunt regulators 332 and 336 are provided to clamp a resonant voltage rise that is generated when a reactive inductance, created by the magnetic antennas 510 and 520, is cancelled by the tuning capacitors 325 and 331 when the output signal is tuned to a high center-frequency channel.

This ensures that an adequate current level is provided in the output signal to drive the magnetic antennas 510, 520. In one embodiment, the shunt regulators 332 and 336 are bipolar shunt regulators.

In other embodiments, where the safe area voltage and current interface 200 is configured to drive a capacitive load, the tuning capacitors 325 and 331 are replaced with tuning inductors (not shown) and the shunt regulators 332 and 336 are provided to clamp a resonant voltage rise that is generated when a reactive capacitance is cancelled by the tuning inductors.

Each of the shunt regulators 332 and 336 are connected in series to a corresponding shunt regulator stability element 333 and 337, respectively, and then to a ground 339. The shunt regulator stability elements 333 and 337 promote current sharing between the shunt regulators 332 and 336, thereby allowing minor variances between each of the corresponding shunt regulators 332 and 336.

Also, each of the interface circuits 232 and 234 includes interface elements 334 and 338, respectively. The interface element 334 is made up of a series of resistor elements 335 connected in series. Similarly, the interface element 338 is made up of a series of resistor elements 339 connected in series. In another embodiment, the interface elements 334 and 338 are made up of a series of inductor elements or capacitor elements connected in series.

A plurality of resistor elements connected in series is used as opposed to a large single resistor element in order to provide redundancy and fault protection in case one or more of the resistor elements is shorted out. This allows the safe area voltage and current interface component 200 to still operate within specified safety limit levels even if one or more of the resistor elements 335 and 339 in the interface elements 334 and 338 fail. That is, the greater the number of resistors making up the resistors elements 335 and 339, the less the impact on the signal outputted from the interface circuits 232, 234 should one or more of the resistors making up the resistor elements 335 and 339, respectively, fail or short out. This allows the interface circuits 232 and 234 to operate within designed safety limits and ensures that a current and voltage level of the signal outputted from the safe area voltage and current interface component 200 does not exceed an intrinsically safe current and voltage level, while maintaining the peak current level of the outputted signal to a level sufficient to drive an electronic component disposed in an unsafe environment.

In other embodiments, the interface elements 334 and 338 can be one or more inductor elements or capacitor elements connected in series.

The interface elements 334 and 338 are designed to limit the current and voltage levels of the output signal sent to output terminals 240 and 245 to ensure that the output signal meets intrinsically safe current and voltage levels. The interface elements 334 and 338 also work against the shunt regulators 332 and 336, respectively, by limiting the maximum current available to the shunt regulators 332 and 336 when a load, such as the magnetic antenna unit 500, dumps energy back into the safe area voltage and current interface component 200.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A safe area voltage and current interface, comprising:
an antenna and mode selection unit that determines a frequency mode and an antenna mode for an output signal;
an antenna tuner unit directly connected to the antenna and mode selection unit, the antenna tuner unit configured to tune the output signal based on the frequency mode and antenna mode determined by the antenna and mode selection unit; and
an interface unit directly connected to the antenna tuner unit, the interface unit configured to ensure that a current and voltage level of the output signal does not exceed an intrinsically safe current and voltage level, while maintaining the peak current level of the output signal to a level sufficient to drive an electronic component disposed in a unsafe environment.

2. The safe area voltage and current interface of claim 1, wherein the antenna tuner unit is configured to tune the output signal for a long loop magnet antenna or a medium loop magnet antenna.

3. The safe area voltage and current interface of claim 1, wherein the antenna tuner unit is configured to tune the output signal to a high center-frequency channel or to a low center-frequency channel.

4. The safe area voltage and current interface of claim 1, wherein the antenna tuner unit includes a scaling element for tuning the output signal based on the frequency mode determined by the antenna tuner unit.

5. The safe area voltage and current interface of claim 1, wherein the antenna tuner unit includes an array of capacitors for cancelling out a reactive inductance from the electronic component when the output signal is tuned to a high frequency channel.

6. The safe area voltage and current interface of claim 1, wherein the interface unit includes an interface element that ensures that the output signal does not exceed an intrinsically safe current and voltage level.

7. The safe area voltage and current interface of claim 1, wherein the interface unit includes an array of shunt regulators that are configured to clamp a resonant voltage rise to maintain the peak current level of the output signal to the level sufficient to drive the electronic component disposed in the unsafe environment.

8. A safe area electronic system, comprising:
a signal power source that generates a voltage signal;
a safe area voltage regulator that receives the voltage signal and outputs the voltage signal with a regulated peak voltage that does not exceed a safe area voltage threshold; and
a safe area voltage and current interface that receives the voltage signal with the regulated peak voltage and outputs an output signal that is configured to drive an electronic component located in an unsafe environment, the safe area voltage and current interface including:
an antenna and mode selection unit that determines a frequency mode and an antenna mode for the output signal,
an antenna tuner unit directly connected to the antenna and mode selection unit, the antenna tuner unit configured to tune the output signal based on the frequency mode and antenna mode determined by the antenna and mode selection unit, and
an interface unit directly connected to the antenna tuner unit, the interface unit configured to ensure that a current and voltage level of the output signal does not exceed an intrinsically safe current and voltage level, while maintaining the peak current level of the output signal to a level sufficient to drive an electronic component disposed in a unsafe environment.

9. The safe area electronic system of claim 8, wherein the signal power source, the safe area voltage regulator and the safe area voltage and current interface are disposed in an explosion proof box.

10. The safe area electronic system of claim 8, wherein the signal power source is an audio power amplifier.

11. The safe area electronic system of claim 8, wherein the antenna tuner unit is configured to tune the output signal for a long loop magnet antenna or a medium loop magnet antenna.

12. The safe area electronic system of claim 8, wherein the antenna tuner unit is configured to tune the output signal to a high center-frequency channel or to a low center-frequency channel.

13. The safe area electronic system of claim 8, wherein the antenna tuner unit includes a scaling element for tuning the output signal based on the frequency mode determined by the antenna tuner unit.

14. The safe area electronic system of claim 8, wherein the antenna tuner unit includes an array of capacitors for cancelling out a reactive inductance from the electronic component when the output signal is tuned to a high center-frequency channel.

15. The safe area electronic system of claim 8, wherein the interface unit includes an interface element that ensures that the output signal does not exceed an intrinsically safe current and voltage level.

16. The safe area electronic system of claim 8, wherein the interface unit includes an array of shunt regulators that are configured to clamp a resonant voltage rise to maintain the peak current level of the output signal to the level sufficient to drive the electronic component disposed in the unsafe environment.

* * * * *